Patented Sept. 30, 1941

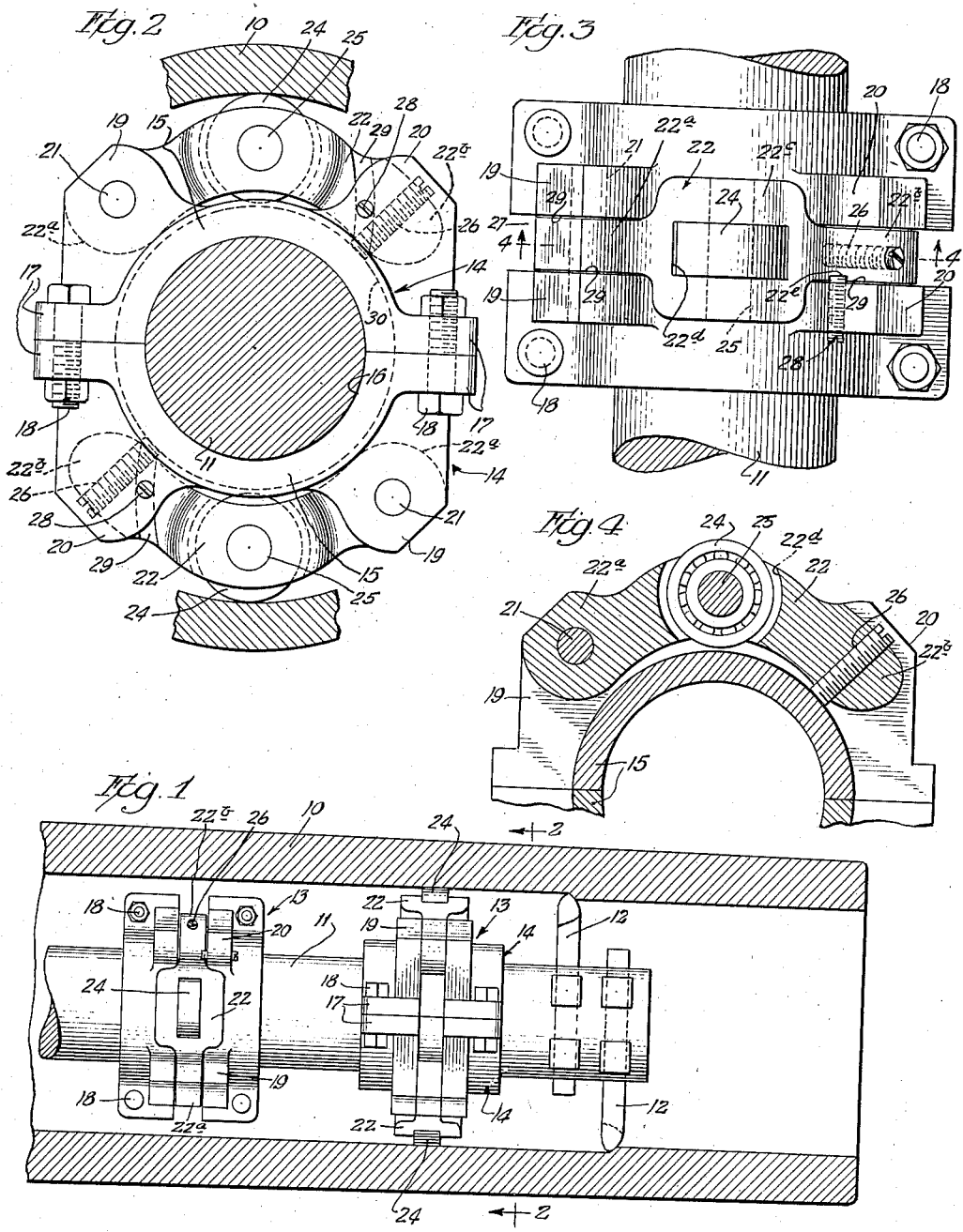

2,257,609

UNITED STATES PATENT OFFICE 2,257,609

PILOT FOR BORING BARS

Bernard M. Kollath, Chicago, Ill.

Application June 25, 1941, Serial No. 399,609

7 Claims. (Cl. 77—55)

This invention relates to improvements in pilots for boring bars.

One object of the invention is to provide an improved pilot for centering the bar and a boring or cutting tool or tools carried thereto to prevent sagging of the bar and off-center operation of the tools.

Another object of the invention is to provide an improved pilot which avoids imposition of a heavy frictional load on the turning mechanism of the work piece and which is provided with radially adjustable means to enable the pilot to be utilized in work pieces of different internal diameters and thereby avoid the necessity for changing pilots after each of a succession of cuts in a single work piece or in operating on successive work pieces, the initial internal diameters of which are not precisely uniform.

A further object of the invention is to provide a pilot having a pair of adjustable arms each carrying a roller that contacts the inner surface of the work piece for centering and guiding the bar for cutting tools during boring operations, the rollers being located in a common diameter of the bar in all positions of like adjustment of the arms.

Another object of the invention is to provide a pilot comprising a pair of identical clamping members adapted to be secured to a boring bar and provided with an adjustable anti-friction means for centering the bar with respect to the bore of the work piece.

An additional object of the invention is to provide a pilot adapted to be clamped concentrically on a boring bar, and of such construction that other faces or surfaces that must be precisely finished can be formed by lathe operations as distinguished from milling machine operations, for example.

Other and further objects of the invention relate to various features of construction and arrangement of parts which will be apparent from a consideration of the following specification and accompanying drawing; wherein Figure 1 is a longitudinal sectional view through a tubular work piece illustrating two of the improved pilots in position on a boring bar located in the work piece.

Fig. 2 is a broken sectional view taken on line 2—2 of Fig. 1.

Fig. 3 is a top plan view of the pilot shown in Fig. 2.

Fig. 4 is a broken sectional view taken on line 4—4 of Fig. 3.

In the drawing, 10 indicates a work piece of tubular form which may be, for example, a gun barrel which is to be bored internally to a precise given diameter. In Fig. 1, a boring bar 11 is shown provided at its forward end with a pair of cutting tools 12. The tools themselves and the means whereby they are secured in properly adjusted position to the bar 11 or the mechanism for rotating the work piece form no part of the present improvements. For the purpose of locating the bar 11 concentrically with reference to the bore of the work piece, one or more of the improved pilots, indicated generally by the numeral 13, are attached to the bar. Two of such pilots are illustrated in Fig. 1.

The pilot 13 is formed of a pair of identical clamp sections indicated generally by the numerals 14. As shown in the drawing, each section is provided with a semi-cylindrical body or section 15, the internal surface 16 of which corresponds to the external surface of the boring bar 11 whereby two such sections 15 can be clamped upon the boring bar to prevent relative rotation of the pilot with reference to the bar. For the purpose mentioned, the members 15 are provided with flanges 17 having registering openings therethrough for receiving bolts 18 by means of which, as stated, the sections can be clamped upon the bar 11. Each section 14 of the pilot is provided with two pairs of ears on its outer surface which are designated by the numerals 19—19 and 20—20. The ears 19 of each section are bored to receive a pivot or bearing pin 21 upon which is swingably mounted an arm 22.

Each arm 22 is provided with an end portion 22ª which is located between the ears 19—19, while at the opposite end each arm is provided with a portion 22ᵇ adapted to seat between the ears 20. The intermediate portion 22ᶜ of each arm is provided with a recess 22ᵈ in which is located an anti-friction member or roller 24. The roller is mounted upon a shaft or pin 25 as shown in the drawing and is of such diameter that its outer surface is adapted to contact and roll upon the internal surface of the work piece 10. The end 22ᵇ of each of the arms 22 is provided with means for swinging the arm pivotally about its respective pin 21 for moving the roller 24 outwardly or inwardly with reference to the axis of the work piece and to thereby adjust the rollers for rolling contact with the internal surface of a work piece.

The adjusting means disclosed comprises a threaded stud 26, one of which is provided in the end portion 22ᵇ of each of the arms 22. The inner end of each of the studs 26 is arranged to contact an outer portion of the respective pilot section 14 at the base of the channel 27 defined by the ears 19 and 20 and thereby force the end portion 22ᵇ outwardly as the stud 26 is screwed inwardly. By turning the studs 26 a given extent, the respective rollers 24 will be moved outwardly uniform distances from the axis of the bar. It will be noted that the axes of the pins 21—21 are located on a common diameter of the bar and that the rollers 24 likewise are diametrically opposed. Hence, by making a like adjustment of the studs, the rollers 24 will be moved outwardly, and will be positioned in a common diameter of the bar, and will center the latter with reference to the internal surface of the work piece with which the rollers contact.

For the purpose of locking the arms against free outward swinging movement, one of the ears 20 of each section 14 is provided with a set-screw 28 which is arranged to be turned inwardly against the adjacent face of the section 22ᵇ of the arm. The inner end of each of the set-screws 28 is arranged to seat in an arcuate groove 22ᵉ formed in a portion 22ᵇ, the arc of the groove being generated about the axis of the respective pin 21. The provision of the grooves prevents the end of the set-screws from deforming or marring the vertical faces of members 22ᵇ. The inner vertical faces of the ears are indicated by reference characters 29, and it is desirable that said faces be not only properly spaced apart for the purpose of snugly receiving the respective portions 22ᵃ and 22ᵇ of the arms, but be parallel as well, in order that the portions 22ᵃ and 22ᵇ of the respective arms 22 will operate without binding.

These faces 29 of the ears can be formed accurately and economically by mounting an assembled pilot in a lathe and thereby cutting or finishing the channel 27. The internal surface 16 of the sections can similarly be formed on a lathe, whereby accuracy in the formation of these faces can readily be obtained. Likewise, a groove 30, at the base of channel 27 can be formed in the outer surfaces of each section 14 into which the studs 26 project as shown in Fig. 2 and which provides clearance for the roller 24 when the arms 22 are in the retracted position shown in Fig. 2. The base of the groove 30, which is contacted by the inner ends of the studs 26, can readily be formed truly concentric with the axis of the bar 11, and hence, by turning the studs 26 inwardly each a given extent from like positions of adjustment, the rollers 24 will be moved uniform distances from the axis of the bar, and hence, will position the latter in centered relation with respect to the internal surface of a work piece contacted by the rollers.

By reason of the foregoing construction, the parts of the pilot can not only readily be assembled upon a boring bar, but the two sections constituting a pilot can be formed with the required precision upon the lathe. In Fig. 1 of the drawing two pilots are shown mounted upon the boring bar 11, but it will be obvious that additional pilots may be employed when desired, and that where two or more are employed they may be located in different angular positions upon the bar whereby each pair of rollers will be located in different diameters of the bar or work piece and thereby support the bar against movement in any direction from its concentric position.

In using the improved pilots, the shavings or chips cut by the tools 12 can be removed from the work piece in the direction in which the pilot is advanced through the work piece, that is, to the right as viewed in Fig. 1, and hence, can be constantly cleared from the work piece in advance of the pilots. The removal of small pieces of metal from the work piece can be effected by utilizing a blast of air or by flushing if desired since the pilots do not wholly obstruct the bore of the work piece.

While I have shown and described an embodiment of my invention, it will be apparent that various changes may be made in the structure shown and described without departing from the spirit and scope of the invention.

I claim:

1. A boring tool pilot comprising a pair of cooperating clamp sections provided with means for clamping the same about a boring member, a plurality of arms each pivotally secured at one end to one of said clamp sections, adjusting means at the opposite ends of said arms, and rollers intermediate said arm ends adapted to be adjusted by said adjusting means into positions for contacting the wall of the work piece for centering the boring member with respect to the inner surface of a work piece to be bored.

2. A boring tool pilot comprising a pair of cooperating clamping sections provided with means for clamping the same about a boring member, a pair of arms each pivotally secured at one end to one of said sections on diametrically opposite axes with respect to said boring member, said arms extending in the same rotative direction from the pivotal axes thereof, a roller mounted on each of said arms intermediate the end thereof each on an axis equi-distant from the pivotal axis of the respective arm and means at the opposite ends of said arms for adjusting the same about the respective axes thereof for moving the peripheries of the rollers into positions for centering contact with the wall of a work piece.

3. A pilot for boring apparatus comprising a pair of semi-cylindrical clamping members adapted to be clamped to a boring member in a position co-axial with respect thereto, a pair of rollers for contacting the interior wall of a work piece, and adjustable means for supporting said rollers in positions for mutual cooperation in centering the boring member with respect to the axis of the work piece.

4. A pilot for boring apparatus comprising a pair of semi-cylindrical clamping members adapted to be clamped about a boring member in a position co-axial with respect thereto, a pair of rollers for contacting the wall of a bore of a work piece, and a pair of arms each pivotally attached at one end to one of said clamping members and arranged to support said rollers in diametrically opposite positions with respect to the axis of the bore of the work piece and each provided at the opposite end with means for moving said arms pivotally for adjusting the respective rollers toward or away from the axis of the boring member for adapting the pilot for use in bores of different diameters.

5. A pilot for a boring member comprising a pair of semi-cylindrical clamping sections adapted to be clamped about a bore rod concentrically with respect thereto, each of said sections being provided with a pair of ears, a pair of arms each pivotally supported at one end by one pair of said ears, a second pair of ears on each of said sections aligned with the other pair thereof for receiving therebetween the opposite end of the respective arm, a roller carried by each arm intermediate the end thereof for rolling contact with the wall of a bore for supporting the bore rod therein, means for adjusting said arms pivotally for moving the rollers into positions for rolling contact with the wall of a bore, and means cooperating with said second mentioned ears for clamping said second end of each of said arms in such adjusted positions.

6. A pilot for a boring member comprising clamping means adapted to be secured to the boring member, opposed rollers provided with adjustable means movably securing the same to said clamping means, and means cooperating with said adjustable means for actuating the latter whereby the rollers can be moved toward or away from the axis of the boring member and into positions for rolling contact with the walls of the bores of different diameters for supporting the boring member co-axially with respect to such bores.

7. A pilot comprising a pair of similar sections provided with means for clamping the same about a boring bar, a pair of arms mounted on said sections at diametrically opposite points, a roller carried by each arm for rolling contact with the interior wall of a work piece being bored, and means for adjusting said arms pivotally for moving the rollers toward or away from the axis of the bar for locating the rollers in positions for mutual cooperation in centering and supporting the boring bar within the work piece.

BERNARD M. KOLLATH.